United States Patent [19]
Kirkpatrick et al.

[11] 3,835,210
[45] Sept. 10, 1974

[54] METHOD OF FORMING POWDER COMPACTS

[75] Inventors: Milton E. Kirkpatrick, Palos Verdes Peninsula; Ralph A. Mendelson, Westminster, both of Calif.

[73] Assignee: TRW Inc., Redondo Beach, Calif.

[22] Filed: Apr. 16, 1973

[21] Appl. No.: 351,485

Related U.S. Application Data

[60] Continuation of Ser. No. 167,614, July 30, 1971, abandoned, which is a division of Ser. No. 848,641, Aug. 8, 1969, Pat. No. 3,650,646, which is a division of Ser. No. 707,813, Feb. 23, 1968, Pat. No. 3,496,425, which is a continuation-in-part of Ser. No. 509,970, Nov. 26, 1965, abandoned.

[52] U.S. Cl.................... 264/61, 264/104, 264/125, 264/332
[51] Int. Cl............................................ C04b 35/00
[58] Field of Search ............ 264/56, 111, 313, 332, 264/DIG. 50, 164, 272, 125, 61

[56] References Cited
UNITED STATES PATENTS

| | | | |
|---|---|---|---|
| 2,558,823 | 7/1951 | Crowley et al. | 264/56 |
| 2,893,062 | 7/1959 | Penrice | 264/DIG. 50 |
| 3,399,256 | 8/1968 | Robinson et al. | 264/332 |
| 3,665,064 | 5/1972 | Mosler et al. | 264/104 |

*Primary Examiner*—Robert F. White
*Assistant Examiner*—J. R. Hall
*Attorney, Agent, or Firm*—Daniel T. Anderson; Jerry A. Dinardo; Willie Krawitz

[57] ABSTRACT

A mass of powder particles is enclosed within a soft elastomeric container and placed in a die cavity with a hard elastomeric sealing member placed between the soft elastomeric container and a movable die punch. Pressure applied to the die is transmitted substantially isostatically by the soft elastomeric container to the powder particles, while the hard elastomeric member provides a seal for preventing extrusion of the soft elastomeric material.

5 Claims, 9 Drawing Figures

Milton E. Kirkpatrick,
Ralph A. Mendelson,
INVENTORS
BY

AGENT

Milton E. Kirkpatrick,
Ralph A. Mendelson,
INVENTORS

BY

Jerry G. Dinardo
AGENT

METHOD OF FORMING POWDER COMPACTS

CROSS REFERENCE TO RELATED APPLICATIONS

This is a continuation of application Ser. No. 167,614, filed July 30, 1971, now abandoned, which is a division of application Ser. No. 848,641 filed Aug. 8, 1969, now U.S. Pat. No. 3,650,646, which is a division of application Ser. No. 707,813 filed Feb. 23, 1968, now U.S. Pat. No. 3,496,425, which in turn is a continuation-in-part of application Ser. No. 509,970 filed Nov. 26, 1965, now abandoned.

BACKGROUND OF THE INVENTION

1. Field of the Invention

This invention relates to the art of forming powder into shaped articles, and particularly to the art of forming powder compacts of uniform interconnected porosity.

There are many applications that require the use of porous powder compacts of uniform interconnected porosity. Such powder compacts find use in porous tungsten ionizers, tantalum capacitors, fuel cell electrodes, precision filters, heat pipe liquid transfer bodies, controlled surface area members, flow control devices, liquid gas separation devices, and precision diffusers, to mention a few examples.

2. Description of the Prior Art

To further explain the need for uniform interconnected porosity in powder compacts, one of the foregoing applications cited by way of example will be described in more detail. One type of ion engine currently being developed for long-term space flights is known as a contact-type ion engine. In such an ion engine, a stream of cesium vapor atoms is passed through a heated porous tungsten member which serves as an ionizer. In passing through the heated tungsten member, the cesium vapor particles lose an electron and emerge as ions. The ions are then subjected to accelerating electric fields to produce a desired thrust.

Invariably, a number of the cesium vapor atoms pass through the tungsten member as neutral atoms, thereby degrading the efficiency of the porous ionizer. Since the fractional part of neutral cesium atoms is dependent upon the flow rate or current density of the total cesium flow, uniformity in the interconnected porous structure is a critical factor in promoting high ion yield. By uniform interconnected porosity is meant that the many paths connecting the pores of the ionizer are of minimum and uniform width and spacing.

The conventional methods of fabricating the tungsten ionizer involve pressing tungsten powder in a complex and expensive steel die, using long dwell times and relative high compacting pressures. The results obtained from such methods usually fail to produce compacts that meet the requirements for ion emitters, for a number of reasons. In the first place, the use of a steel die results in a significant wall friction which prevents the compacting pressure from being applied uniformly across the structure, thereby causing variations in the density of the compact as well as nonuniformity of the interconnected porosity. Accordingly, the use of long dwell times at high pressure within the steel die results in deformation of the tungsten at the surface of the compact and destroys the interconnected porous structure. The lack of interconnected porosity produces nonuniformity of the permeable porosity.

Another need for powder compacts of uniform interconnected porosity exists in the manufacture of porous, sintered tantalum anodes for use in capacitors. Such anodes are made from porous compacts of tantalum powder. A high degree of uniform interconnected porosity is necessary to obtain a high CV, which is an abbreviation for the product of capacitance times voltage. The CV product or CV of a capacitor is a figure of merit which describes the qualities of the capacitor in terms of its capacitance and formation voltage.

The construction of a capacitor having a porous, sintered tantalum anode is essentially the following. Tantalum powder is pressed into a dense but porous compact and sintered to produce one electrode, called the anode. The surface area of this consists of all the surfaces of the powder particles that are interconnected through the pores of the compact. The anode is anodized to form an oxide film on the porous tantalum, without filling the pores. The oxide film serves as the dielectric and its thickness is directly proportional to the forming voltage or voltage applied during the anodization process. The pores are then filled with conductive material which serves as the other electrode and is called the counterelectrode.

It can be seen that any pores that are isolated from, and not connected with, the remaining pores of the sintered anode are not reached either by the dielectric film or by the counterelectrode material. These isolated pores are completely ineffectual in the capacitor. Thus, the more interconnected pores there are, the greater the capacitance that can be obtained, since the capacitance value is directly proportional to the electrode surface area, which in turn is determined by the interconnected pore area. The smaller the powder particle size, the greater the electrode surface area.

In connection with the discussion above on the CV of a capacitor, it was stated that V was an abbreviation for voltage. More precisely, the V refers to the formation voltage applied during the anodizing process. The higher the formation voltage V, the thicker the dielectric film, and, thus, the higher the breakdown voltage. Conversely, the thicker the dielectric film, the lower the capacitance C. This results from the well-known relationships that the capacitance is inversely proportional to the electrode spacing, the breakdown voltage is directly proportional to the electrode spacing, and the thickness of the dielectric film determines the electrode spacing.

Accordingly, a primary object of this invention is to provide a method for producing powder compacts of uniform and greater interconnected porosity.

A further object of this invention is to provide a method by which substantially isostatic pressure will be applied to a powder during its formation into a compact.

SUMMARY OF THE INVENTION

The foregoing and other objects are realized according to this invention by a method wherein a charge of compactable powder particles is enclosed within an elastomeric container made of two parts of different hardness and flowability. The powder particles are completely enclosed in the first part of relatively soft, flowable, elastomeric material. The other part, which is made of relatively hard, non-flowable, elastomeric material, is placed externally of the first part. The two-part container is shaped to conform to the shape of a die cavity, where it is placed and compressed. In the die cavity, the hard elastomeric part is in such a position as to provide a seal between the soft elastomeric part and the crevices in the die, such as the junction that is located between a die wall and a die punch. Due to its flowability, the inner, relatively soft, elastomeric material transmits substantially isostatic pressure to the powder. The outer relatively hard elastomeric material prevents the soft material from extruding out of the die, and thereby allows the pressure equilibrium on the compact to be maintained.

DESCRIPTION OF THE PREFERRED EMBODIMENTS

Figure 1:
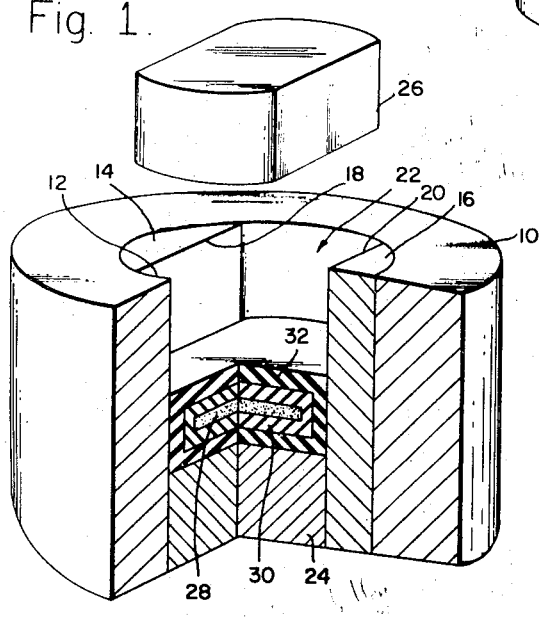
FIG. 1 is a perspective view, partly in section and with portions removed, of one form of apparatus for fabricating powder compacts in accordance with the invention.

Referring to FIG. 1, there is shown a cylindrical die member 10 provided with a longitudinal cylindrical bore 12. Within the cylindrical bore 12 and extending along the length thereof are a pair of oppositely disposed die shoes 14 and 16. The die shoes 14 and 16 are curved on their outer surfaces to mate with the inner surface of the cylindrical bore 12. The die shoes 14 and 16 have inner surfaces 18 and 20 which are flat, and are arranged so that the flat surfaces 18 and 20 are parallel to each other. Thus, there is formed within the die member 10 a die cavity 22, which is bounded by the flat surfaces 18 and 20 of the die shoes 14 and 16, respectively, and by the exposed inner surface portions of the cylindrical bore 12.

Fitted within the die cavity 22 is a bottom punch 24. Shown above the die cavity 22 is a top punch 26, which is similar to the bottom punch 24. In operation, the top punch 26 may be lowered into the die cavity 22 to compress an assembly nested between the punches 24 and 26 and containing a compactable powder, as will be explained.

The die member 10, the die shoes 14 and 16, and the two punches 24 and 26 are all made of hard, nondeformable material such as steel. While the die cavity 22 is shown as having a generally rectangular configuration, it should be understood that other configurations may be used to suit manufacturing needs.

In accordance with one embodiment of the invention, a method is provided for enclosing a compactable powder within an assembly forming dual elastic containers. A compactable powder 28, made of metal or non-metal, is enclosed within a first container 30 made of relatively soft, flowable, elastomeric material. The first container 30 is snugly enclosed within a second container 32 made of relatively hard, nonflowable, elastomeric material, with the second container shaped to fit rather loosely within the walls of the die cavity 22. The interior of the first container 30 is shaped to conform to the configuration desired of the final powder compact, which in this example is illustrated as being a thin, flat, rectangular plate. The horizontal surfaces of the two elastomeric containers 30 and 32 are parallel to the horizontal bearing surfaces of the two punches 24 and 26.

Figure 2:
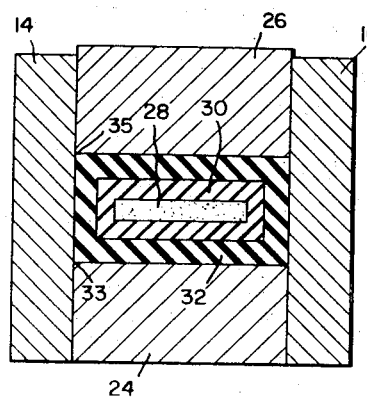
FIG. 2 is a sectional view of the apparatus of FIG. 1.

In operation, the top punch 26 is lowered into the die cavity 22, as shown in FIG. 2, and suitable force is applied to the two punches 24 and 26 to compress the assembly comprising the two containers 30 and 32 and powder 28. The compressing force is transmitted through the second container 32 to the first container 30. Being a relatively soft and flowable material, the first container 30 acts like a liquid under pressure, and absorbs any pressure gradients exerted upon it by the second container 32. Consequently, the first container 30 distributes the pressure uniformly over all surfaces of the powder 28. the first container 30 can be said to exert pressure substantially isostatically over the powder 28.

Because the pressure is uniformly distributed over the powder 28, there is less tendency of the pores between the powder particles to close during compaction. As a result, the powder particles can be compacted to a higher density, corresponding to the most efficient packing of spherical particles, while still retaining the desired uniform interconnected porosity.

Being relatively hard and less flowable, the second container 32 confines the softer, more flowable material of the first container 30 so that neither the powder 28 nor the material of the first container 30 are extruded from the die cavity 22. The second container 32 forms a seal at the crevices or junctions 33 and 35 between the side walls of the die cavity 22 and the vertical surfaces of the die punches 24 and 26, respectively. In the past, extrusion of powder material along the walls of the die cavity has resulted in scoring of the walls of the steel die. Such an occurance is practically eliminated by the isolation afforded by the second container 32. The hardness or toughness of the material of the second container 32 prevents the material of the second container 32 from extruding from the walls of the die cavity 22 under the high pressure required for compacting the powder 28.

Due to the elasticity of the materials of both containers 30 and 32, they return to their original size when the compacting pressure is relieved, thereby releasing the powder compact. This prevents any mechanical damage of the powder compact during its removal from the die cavity 22.

Figure 3:
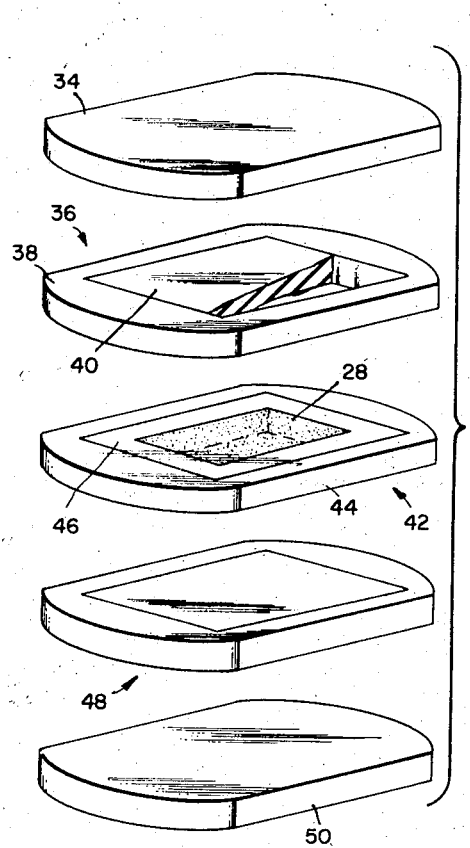
FIG. 3 is an exploded view showing one means of assembling dual elastic containers for a powder compact in accordance with the invention.

FIG. 3 is an exploded view of one means by which the powder 28 can be assembled within the containers 30 and 32. However, it will occur to those skilled in the art that other arrangements may be used for assembly. The container assembly shown consists of five flat layers of elastic material, all of which conform to the contours of the walls of the die cavity 22. The first layer 34, which is placed upon the bottom punch 24, is a solid layer of the hard elastomeric material. The second layer 36, which is placed upon the first layer 34, is formed of a rim 38 of a hard elastomeric material which surrounds a rectangular insert 40 made of the soft elastomeric material. The third layer 42, which is placed upon the second layer 36, consists of a rim 44 of a hard elastomeric material provided with a liner 46 of the soft elastomeric material. The space within the liner 46 forms a cavity which will be filled with the powder 28. The fourth layer 48 is identical to the second layer 36 and is placed upon the third layer 42, thereby enclosing the powder 28 within a container of soft elastomeric material. The fifth layer 50 is identical to the first layer 34 and is placed upon the fourth layer 48 to enclose the first container within a second container of hard elastomeric material.

It has been found that spherical powder particles provide the most uniform porous structure combined with the optimum density both of solid material and of interconnected porosity. For use in ionizer applications, tungsten compacts have been successfully made and operated, using tungsten spheroids falling within two size ranges. In the smaller size range the tungsten particles ranged in diameter from 2 to 5 microns, while in a larger size range they ranged in diameter from 7 to 9 microns. The compacting pressure ranged from 35,000 to 50,000 pounds per square inch, applied for a period of less than one minute. Following the compaction process, the tungsten compact was sintered at about 2,000° centigrade in a vacuum furnace for about an hour. Porous tungsten structures having interconnected porosities of 99 percent and higher have been achieved for both the above particle size ranges.

One material that has been successfully used for the soft elastomeric material is a silicone rubber having a Shore A hardness less than about 40. This material is known in the trade as Dow Corning DC 6510. An example of a material that has been successfully used for the hard elastomeric material is a polyurethane elastic material known in the trade as American Latex Daycollan 80. This material has a Shore A hardness of about 80. It is apparent that other suitable materials may be used for both the soft and hard elastomeric materials.

While the hard elastomeric material has been shown as a container 32 completely enclosing the inner container 30, it will be understood that such construction may be generally used to seal in the soft elastomeric material no matter where the crevices are located in the die cavity walls. However, it may be preferred to utilize a more simplified construction by employing a simple insert or a thin slab of the hard elastomeric material at the locations where such wall crevices or junctions occur.

Figure 4:
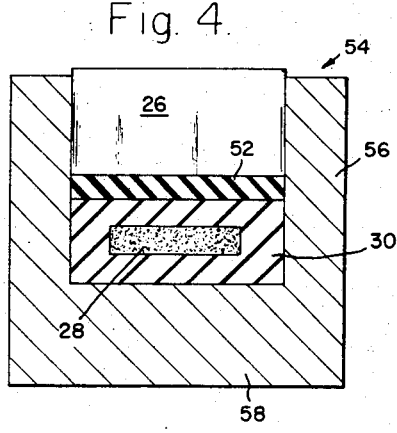
FIGS. 4 and 5 are sectional views showing alternative forms of apparatus according to the invention.

FIG. 4 shows an alternative arrangement in which a slab 52 of hard elastomeric material is placed between a top die punch 26 and the soft elastomeric container 30 that is placed in a die 54 where side wall 56 and base 58 are formed of a single piece of metal. The slab 52 forms a seal between the top die punch and the internal surface of the wall 56.

Figure 5:
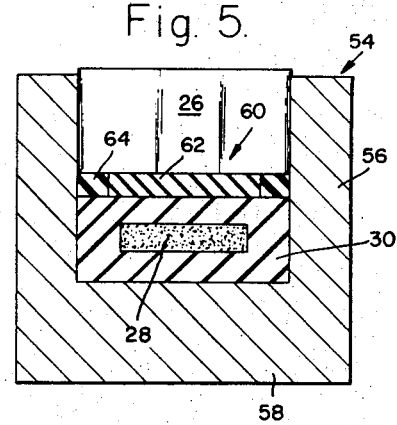

In FIG. 5, a slab 60 placed between the top die punch 26 and the soft elastomeric container 30 has an inner portion 62 of soft elastomeric material and a rim 64 of hard elastomeric material. The rim 64 provides a seal between the top die punch and the internal surface of the die wall 56 in much the same fashion as the slab 52 of FIG. 4 and container 32 of FIGS. 1-3.

Figure 6:
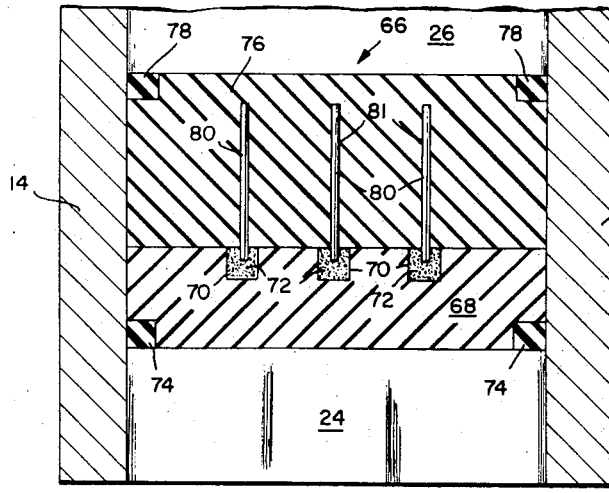
FIG. 6 is a sectional view of apparatus for forming tantalum anodes for use in slug capacitors.

FIG. 6 illustrates apparatus for fabricating porous tantalum anodes for use in tantalum slug capacitors. An elastomeric enclosure 66 is disposed in a die cavity between die shoes 14 and 16 and die punches 24 and 26. The elastomeric enclosure 66 includes a bottom slab 68 of soft elastomer having a number of cavities 70 formed in its upper surface for containing tantalum powder 72. An insert 74 of hard elastomer rims the outer periphery of the lower side of the slab 68. On top of the bottom slab 68 is placed a top slab 76 of soft elastomer, the upper side of which is rimmed with an insert 78 of hard elastomer. Prior to compacting, a tantalum wire 80 is inserted in each mass of powder 72, with the wires 80 held vertically in place in long, narrow holes 81 in the top slab 76.

When the enclosure 66 is compressed, the powder masses are squeezed into compacts having the wires 80 embedded therein. When the pressure is released from the die, the two slabs 68 and 76 can be separated and the powder compacts may be lifted out of the cavities 70 by the wires 80.

Tantalum powder particles having an average size of 4 microns have been compacted at pressures of 2,000 to 8,000 pounds per square inch sustained for approximately 15 seconds to form compacts of about 50 percent density; that is, 50 percent powder volume and 50 percent pore volume. These compacts have been formed without the use of binders or lubricants.

The powder compacts are then sintered in vacuum for approximately 10 to 30 minutes at temperatures from about 1,600° to 2,000° centigrade to achieve the required densification.

Figure 7:
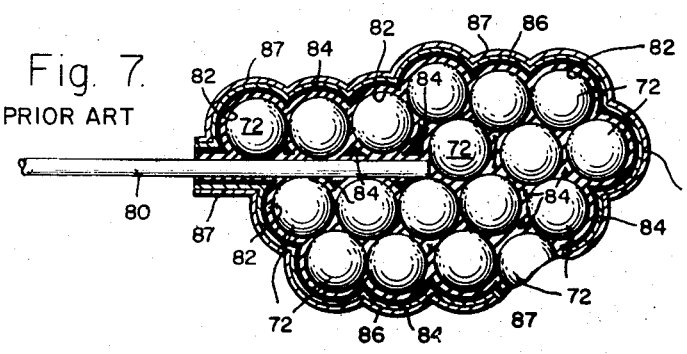
FIG. 7 is a greatly enlarged, fragmentary, sectional view showing some of the component parts of a tantalum slug capacitor.

A prior art process for fabricating tantalum capacitors will now be described with the aid of FIG. 7. The sintered powder compact will hereinafter be referred to as the anode. The sintered anode is first anodized in a water solution of phosphoric acid to produce a film of tantalum pentoxide, which is the dielectric film. The dielectric film 82 covers the exposed surfaces of the tantalum powder 72 and the embedded portion of the tantalum wire 80. The dielectric film 82 forms at a thickness of about 15 angstroms per volt of anodizing or formation voltage.

After anodizing, the anode is dipped in a solution of manganese nitrate to fill the pore space. The anode is then baked to decompose the manganese nitrate and produce a conductive film of manganese dioxide over the dielectric film 82. The process of dipping and baking is repeated several times until the entire pore space is filled with the conductive film 84 of manganese dioxide. The internal pore fillings of manganese dioxide are interconnected with the surface coatings of manganese dioxide to seal the dielectric film 82.

The external surface of the conductive film 84 is next coated with a graphite solution, known in the trade as Aquadag, to form a graphite conductive coating 86. The graphite coating 86 does not penetrate the already filled pore space. The assembly is next dipped in a silver solution to coat the graphite with silver coating 87.

Figure 8:
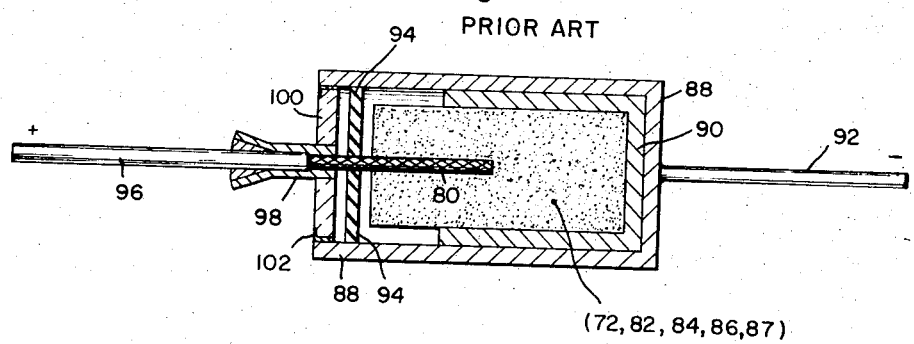
FIG. 8 is a sectional view of a complete tantalum slug capacitor.

Referring now to FIG. 8, the assembly is placed in a metal can 88 that has been pretinned on the inside, and the space between the can 88 and the silver is filled with solder 90. A cathode lead 92 is secured to the can 88 by welding. The remaining constructional elements consist of an insulating washer 94 for centering the tantalum wire 80; an anode lead 96 butt welded to the tantalum wire; a Kovar gland 98 soldered to the anode lead 96; a glass bead 100 sealed to the Kovar gland 98; and a Kovar ring 102 sealed to the glass bead 100 and soldered to the can 88. Kovar is the trade name for a metal having a composition of 54 percent iron, 28 percent nickel, and 18 percent cobalt.

Figure 9:
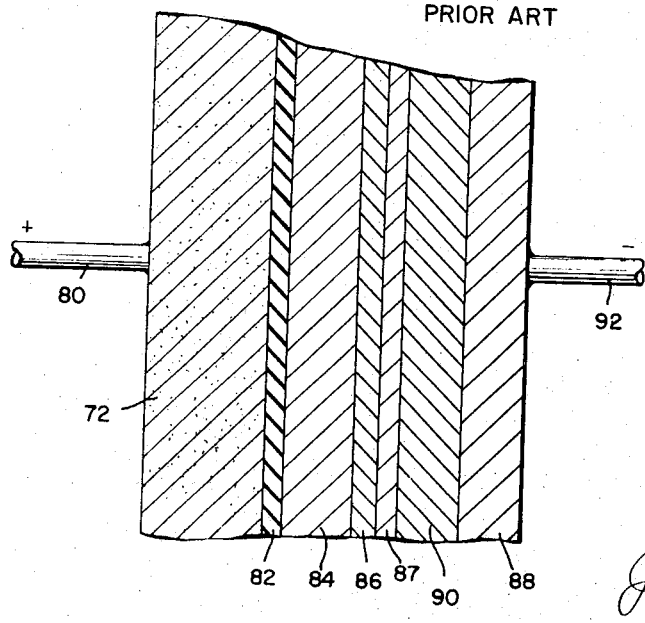
FIG. 9 is a greatly enlarged sectional view of an elemental capacitor associated with a single tantalum powder particle.

A highly magnified section of one of the elemental capacitors associated with a single tantalum powder particle is shown schematically in FIG. 9. The elemental capacitor is essentially comprised of a powder particle 72, the dielectric flim 82 and the conductive coating 84. The total capacitance is the sum of all the elemental capacitors connected in parallel.

Tantalum anodes have been made according to the method of the invention which have a sintered density of about 50 to 80 percent and an interconnected porosity of over 90 percent. By 90 percent interconnected porosity is meant that over 90 percent of the total pore volume is fully interconnected. Using anodes made from tantalum powder with an average particle size of 4 microns, capacitors have been fabricated which have CV's of above 6,000 microforad-volts per gram as compared with CV's of 2,000 to 2,200 microforad-volts per gram for conventional tantalum capacitors. With a tantalum particle size of 8 microns, CV's of above 2,500 have been obtained as compared with CV's of 1,500 in conventional tantalum capacitors.

What is claimed is:

1. In a method of forming a powder compact, comprising:
   a. enclosing a mass of powder within a container made of a first elastomeric material having a Shore A hardness less than about 40;
   b. mounting said container with said powder enclosed therein within a die cavity formed by rigid non-deformable walls, at least one of said walls being movable along other adjoining walls of said die cavity to form a sliding junction;
   c. inserting a sealing member of a second elastomeric material having a Shore A hardness of about 80 between said container and said movable wall so that said sealing member engages said movable and adjoining walls at said junction to provide a seal thereat for preventing extrusion of said first elastomeric material;
   d. applying pressure to said sealing member and said container to cause said container to transmit pressure substantially isostatically on said powder and compact and bond the particles of said powder in a unitary structure to form a powder compact, while causing said sealing member to press against said adjoining walls to seal said container within said die cavity and prevent extrusion of said first elastomeric material;
   e. releasing said pressure from said compact; and
   f. removing said compact from said die cavity.

2. The method of claim 1, wherein an additional one of said walls facing towards said one wall is movable and forms a second junction with said adjoining walls, and following step c):
   inserting a second sealing member of elastomeric material similar to that of said first mentioned sealing member between said container and said additional movable wall so that said second sealing member engages said second movable wall and said adjoining walls at said second junction to provide a second seal for preventing extrusion of said first elastomeric material when step d) is performed.

3. The method of claim 1 wherein following step f) said compact is sintered.

4. In a method of fabricating anodes for slug capacitors, comprising:
   a. providing a first member of a first elastomeric material having a Shore A hardness less than about 40 and having a plurality of cavities formed on a surface thereof, with each cavity conforming to the shape of an anode for a slug capacitor;
   b. providing a second member of said first elastomeric material having a plurality of narrow slots extending therein from a surface thereof mating with said surface of said first member, with each slot conforming to the shape of a wire lead for said anodes;
   c. filling each of said cavities with a mass of powdered anode material;
   d. embedding one end of a wire lead into each mass of said powdered anode material;
   e. placing said second member on said first member to bring said mating surfaces together with the slots in said second member accommodating the unembedded length of said wire leads and with said powder masses enclosed by said first elastomeric material;
   f. mounting said members with said powder masses and wires enclosed therein within a die cavity having rigid non-deformable walls, at least one of said walls being movable along other adjoining walls of said die cavity to form a sliding junction;
   g. inserting a sealing member of a second elastomeric material having a Shore A hardness of about 80 between said first elastomeric material and said movable wall so that said sealing member engages said movable and adjoining walls at said junction to provide a seal thereat for preventing extrusion of said first elastomeric material;
   h. applying pressure to said sealing member and said first elastomeric material so that the fluid properties of said first elastomeric material cause it to transmit pressure substantially isostatically on said powder masses to bond said powder masses and wires and squeeze them into bonded assemblies, while causing said sealing member to press against said adjoining walls to seal said first elastomeric material within said die cavity and prevent extrusion of said first elastomeric material;
   i. releasing said pressure from said assemblies;
   j. separating said first and second members to provide access to said assemblies; and
   k. removing said assemblies from said first member as said fabricated anodes.

5. The method of claim 4 wherein following step k), said assemblies are sintered.

* * * * *